(12) United States Patent
Mueller et al.

(10) Patent No.: US 6,289,989 B1
(45) Date of Patent: Sep. 18, 2001

(54) USE OF BIODEGRADABLE ALCOXYLATION PRODUCTS FOR CLEANING BOREHOLES, BORING INSTRUMENTS OR BORINGS

(75) Inventors: Heinz Mueller, Monheim; Claus-Peter Herold, Mettmann; Berthold Schreck, Duesseldorf; Stefan Podubrin, Muelheim an der Ruhr; Andreas Heidbreder, Duesseldorf, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/297,480

(22) PCT Filed: Oct. 21, 1997

(86) PCT No.: PCT/EP97/05800

§ 371 Date: Jul. 2, 1999

§ 102(e) Date: Jul. 2, 1999

(87) PCT Pub. No.: WO98/19043

PCT Pub. Date: May 7, 1998

(30) Foreign Application Priority Data

Oct. 30, 1996 (DE) .............................................. 196 43 857

(51) Int. Cl.⁷ .................................................... E21B 37/00
(52) U.S. Cl. ........................... 166/311; 507/266; 507/267
(58) Field of Search ................................. 166/311, 312; 510/108, 109, 413, 421, 475, 476; 507/266, 267, 930, 931

(56) References Cited

U.S. PATENT DOCUMENTS

| | | | |
|---|---|---|---|
| 2,978,026 | * 4/1961 | Bemis ................... | 166/312 |
| 3,335,793 | * 8/1967 | Biles et al. ............ | 166/271 |
| 5,232,910 | 8/1993 | Mueller et al. ........ | 507/138 |
| 5,237,080 | 8/1993 | Daute et al. .......... | 554/213 |
| 5,252,554 | 10/1993 | Mueller et al. ........ | 507/138 |
| 5,403,822 | 4/1995 | Mueller et al. ........ | 507/138 |
| 5,990,066 | * 11/1999 | Gordon et al. ........ | 510/238 |

FOREIGN PATENT DOCUMENTS

| | | |
|---|---|---|
| 39 23 394 | 1/1991 | (DE) . |
| 41 34 973 | 4/1993 | (DE) . |
| 0 374 671 | 6/1990 | (EP) . |
| 0 374 672 | 6/1990 | (EP) . |
| 0 386 636 | 9/1990 | (EP) . |
| 0 513 899 | 11/1992 | (EP) . |
| WO90/06980 | 6/1990 | (WO) . |
| WO90/06981 | 6/1990 | (WO) . |
| WO90/10681 | 9/1990 | (WO) . |
| WO94/29570 | 12/1994 | (WO) . |
| WO95/17244 | 6/1995 | (WO) . |
| WO96/01358 | 1/1996 | (WO) . |

OTHER PUBLICATIONS

Derwent Patent Abstract (WPAT) No. 93–152448/18.
Derwent Patent Abstract (WPAT) No. 91–023236/04.
Derwent Patent Abstract (WPAT) No. 90–276694/37.
Derwent Patent Abstract (WPAT) No. 90–194905/26.
Derwent Patent Abstract (WPAT) No. 90–194333/26.

* cited by examiner

Primary Examiner—David Bagnell
Assistant Examiner—Jennifer Dougherty
(74) Attorney, Agent, or Firm—John E. Drach; Glenn E. J. Murphy; Henry E. Millson, Jr.

(57) ABSTRACT

A process for cleaning boreholes, drilling equipment and drill cuttings is presented involving the application of a cleaning composition to surfaces and the subsequent removal of the cleaning composition and soils. The cleaning composition contains a cleaning additive having alkoxylation products obtained by the reaction of ethylene oxide, propylene oxide, butylene oxide or mixtures thereof with an OH-containing $C_{10-22}$ carboxylic acid or derivative thereof, where structural units corresponding to formula (I):

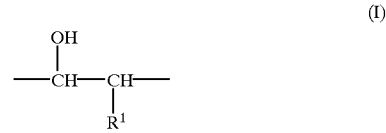

comprise one or both of the 9/10 or 13/14 positions, wherein $R^1$ is a hydrogen atom, an OH group or a $OR^2$ group, $R^2$ is an alkyl group containing 1 to 18 carbon atoms, an alkenyl group containing 2 to 18 carbon atoms or a group corresponding to formula (II):

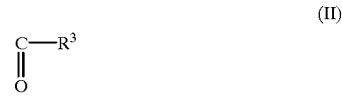

where $R^3$ is a hydrogen atom, an alkyl group containing 1 to 21 carbon atoms or an alkylene group containing 2 to 21 carbon atoms. The cleaning composition is biodegradable.

42 Claims, No Drawings

USE OF BIODEGRADABLE ALCOXYLATION PRODUCTS FOR CLEANING BOREHOLES, BORING INSTRUMENTS OR BORINGS

This application is filed under 35 U.S.C. 371 and based on PCT/EP97/05800, filed October 30, 1996.

BACKGROUND OF THE INVENTION

1. Field of the Invention

This invention relates to the use of biodegradable alkoxylation products for cleaning boreholes, drilling equipment and drill cuttings, to an additive containing these alkoxylation products, to a cleaning composition containing this additive and to processes for cleaning boreholes, drilling equipment and drill cuttings.

2. Discussion of Related Art

In the drilling and development of oil and gas occurrences, cleaning steps have to be introduced at various stages to ensure problem-free drilling and production. Thus, after the actual drilling process, the borehole has to be prepared for the production of oil or gas (completion). To this end, an outer tube or casing has to be introduced and cemented in place to stabilize the borehole. The cement is passed through the casing in an aqueous liquid form, emerges at the lower end of the casing and hardens between the borehole wall and the casing. To guarantee optimal cementing, the borehole wall and the casings have to be freed from adhering residues of the drilling mud and adhering fine-particle solids. If this is not done, the layer of concrete is in danger of developing voids or channels which reduce the stability of the concrete. In addition, residues of the drilling mud and the cement together can form a gelatinous mass which prevents the cement from setting so that the stability of the cement jacket is further reduced.

After the casing has been introduced into the borehole, the actual production tube, which is smaller in diameter than the casing, is installed. In addition, a sealing fluid (or packer fluid as it is also known) is introduced between the production tube and the inner wall of the casing. Before this packer fluid is introduced, the annular space between the casing and the production tube is cleaned. In particular, all fine-particle solids still adhering to the wall of the casing or production tube have to be removed to guarantee the performance of the packer fluid.

The choice of the cleaning composition to perform the functions mentioned above is also determined by the nature of the drilling mud used. In principle, drilling muds are divided into water-based types and oil-based types. Oil-based drilling muds are mainly used today either as so-called "true oil muds", i.e. muds which contain little if any dispersed water, or as so-called invert muds which contain between 5 and 45% by weight of water as dispersed phase, i.e. which form a w/o emulsion. In addition there are water-based o/w emulsions which contain a heterogeneous finely disperse oil phase in a continuous aqueous phase. Petroleum products, such as mineral or diesel oils, are normally used as the oil phase. However, increasingly more stringent ecological requirements have recently led to the development of synthetic oil phases, for example containing esters of certain fatty acids. Drilling muds based on such ester oils are described, for example, in European patents 386 636, 374 671 and 374 672 and show distinctly improved behavior compared with petroleum products in regard to their biological degradability and toxicity. Where drilling muds based on synthetic esters are used, the formation of tacky residues on metal surfaces and on the borehole wall are occasionally observed and can also lead to troublesome deposits.

In The same way as the cement used for the cementing process, the cleaning compositions are pumped downwards through the drill pipe in liquid form, emerge at the bottom of the borehole and are forced upwards through the annular space between the tube and the borehole wall. They detach residues of the drilling muds and solid particles adhering to the surfaces and remove them from the borehole. One such process is described in detail, for example, in WO 94/29570. The compositions are normally used in the form of aqueous or non-aqueous solutions or dispersions. However, they may also be added to the drilling mud in concentrated, solid or liquid form.

Cleaning compositions for the functions described above may be, for example, mixtures of citric acid, pyrophosphate and potassium salts used in solid or dissolved form. These compositions are suitable both for true oil muds and for invert muds. An alternative method is described in European patent 513 899, according to which a fluid containing a dispersed gas phase is used for cleaning boreholes. Under the temperature and pressure conditions prevailing in the borehole, the gas phase forms gas bubbles of a certain size which lead to a turbulent flow of the fluid pumped through the borehole and thus enable the borehole to be mechanically cleaned.

In oil production, deposits of paraffin or asphalt are often formed in the borehole or on the production tubes and reduce output. These deposits have to be removed in the course of stimulation work in order to improve the production rate.

Various solutions have been proposed in the prior art for removing the above-mentioned residues by suitable cleaning compositions. Thus, WO 96/01358 discloses an additive containing an ether amine and/or a base oil, for example an ester, a diester, a surfactant or an olefin, in combination with an alkyl alcohol, preferably a terpene alcohol. This additive is used in the form of an aqueous mixture. WO 95/17244 describes a composition for cleaning surfaces soiled with oil which contain surfactants with HLB values of at least 8 in combination with an oil. Ethoxylated sorbitan fatty acid esters are mentioned as preferred surfactants.

Now, although compositions based on ethoxylated sorbitan fatty acid esters develop a favorable cleaning effect, particularly against the residues occurring where ester-based drilling muds are used, their biological degradability and toxicity do not meet all the requirements of increasingly more stringent environmental legislation.

Accordingly, the problem addressed by the present invention was to provide cleaning compositions for boreholes, drilling equipment or drill cuttings which would show improved ecological compatibility in relation to known compositions for at least the same cleaning performance.

It has now been found that compositions for cleaning boreholes or drilling equipment which contain certain alkoxylation products obtained by reaction of certain OH-containing $C_{10-22}$ carboxylic acids or $C_{10-22}$ carboxylic acid derivatives with ethylene oxide, propylene oxide and/or butylene oxide are at least comparable in their cleaning performance with the prior art and, at the same time, have improved environmental compatibility.

DE 41 34 973 describes water-based cleaning compositions for hard surfaces which contain between 1.0 and 30% by weight of an alkoxylation product of OH-containing carboxylic acids and/or derivatives thereof with 30 to 85% of ethylene oxide or propylene oxide as nonionic surfactants. However, there is nothing in this document to suggest that the compositions in question would also be suitable for cleaning soiled surfaces which come into contact with drilling muds based on petroleum or synthetic esters. In addition, there is nothing in the document in question to indicate that such compounds would be usable under the extreme conditions encountered in oil boreholes in regard to temperature, pressure and exposure to shear forces and aggressive media, such as salt water.

In a first embodiment, the present invention relates to the use of biodegradable alkoxylation products obtained by reaction of ethylene oxide, propylene oxide and/or butylene oxide with $C_{10-22}$ carboxylic acids or $C_{10-22}$ carboxylic acid derivatives which, at least in the 9/10 and/or 13/14 position, contain structural units corresponding to general formula (I):

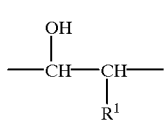

(I)

in which $R^1$ is a hydrogen atom or an OH group or a group $OR^2$, where $R^2$ is an alkyl group containing 1 to 18 carbon atoms, an alkenyl group containing 2 to 18 carbon atoms or a group corresponding to formula (II):

(II)

where $R^3$ is a hydrogen atom, an alkyl group containing 1 to 21 carbon atoms or an alkylene group containing 2 to 21 carbon atoms, for cleaning boreholes, drilling equipment or drill cuttings.

The alkoxylation products themselves are not new. They may be produced in accordance with the teaching of German patent 39 23 394, which is also part of the disclosure of the present application, by reacting the OH-containing carboxylic acid derivatives with ethylene oxide, propylene oxide and/or butylene oxide in the presence of a suitable catalyst, for example at temperatures of 110 to 200° C. and under pressures of $10^5$ to $2 \times 10^6$ Pa.

Suitable educts for OH-containing $C_{10-22}$ carboxylic acids or $C_{10-22}$ carboxylic acid derivatives are any OH-free, unsaturated naturally occurring and/or synthetic $C_{10-22}$ carboxylic acids or derivatives which contain carboxylic acid functions with at least one or two double bonds in the 9, 12, 13 or 14 position. Examples of unsaturated carboxylic acid derivatives are 9c-dodecenoic acid, 9c-tetradecenoic acid, 9c-hexadecenoic acid, 9c-octa-decenoic acid, 9t-octadecenoic acid, 9c,12c-octadecadienoic acid, 9c, 12c, 15c-octadecatrienoic acid, 9c-eicosanoic acid and/or 13c-docosenoic acid and/or mixtures with at least a large content of such unsaturated carboxylic acids. Preferred educts are carboxylic acids containing 16 to 22 carbon atoms and at least one or two double bonds in the 9 and/or 13 position or carboxylic acid mixtures with at least a large content of carboxylic acids containing 16 to 22 carbon atoms and at least one or two double bonds in the 9 and/or 13 position.

Suitable unsaturated carboxylic acid derivatives are, for example unsaturated $C_{10-22}$ carboxylic acid esters, for example unsaturated $C_{10-22}$ carboxylic acid alkyl esters with monohydric alcohols containing 1 to 18 carbon atoms. $C_{10-22}$ carboxylic acid mono-, di- and/or triglycerides containing OH-free unsaturated $C_{10-22}$ carboxylic acid functions with at least one or two double bonds in the 9 and/or 13 position are particularly suitable. Esters of $C_{10-22}$ carboxylic acids with other polyols, such as ethylene glycol or trimethylol propane, are also suitable.

Examples of unsaturated $C_{10-22}$ carboxylic acid $C_{1-18}$ alkyl esters, which can be obtained in known manner by esterification of the corresponding unsaturated carboxylic acid or by transesterification of the corresponding mono-, di- and/or triglycerides with $C_{1-18}$ alkyl alcohols, for example methanol, ethanol, propanol, butanol, isobutanol, 2-ethyl hexanol, decanol and/or stearyl alcohol, are palmitoleic acid methyl ester, oleic acid methyl ester, oleic acid ethyl ester, oleic acid isobutyl ester, oleic acid-2-ethyl hexyl ester and/or oleic acid dodecyl ester and/or $C_{10-22}$ carboxylic acid $C_{1-18}$ alkyl ester mixtures with at least a high percentage content of such $C_{10-22}$ carboxylic acid $C_{1-18}$ alkyl esters, which have at least one or two double bonds in the 9 and/or 13 position in the carboxylic acid esters, such as palm oil methyl ester, soybean oil methyl ester, rapeseed oil methyl ester and/or tallow fatty acid ethyl ester. Other particularly suitable starting materials for the production of the alkoxylation products are fats and/or oils of natural origin of which the carboxylic acid content is made up predominantly of unsaturated $C_{10-22}$ carboxylic acids with at least one or two double bonds in the 9 and/or 13 position, such as for example olive oil, linseed oil, sunflower oil, soybean oil, peanut oil, cottonseed oil, rapeseed oil, palm oil, lard and/or tallow.

Unsaturated $C_{10-22}$ carboxylic acids and/or $C_{10-22}$ carboxylic acid derivatives can be epoxidized to the OH-containing compounds, for example, by reaction with peracetic acid in the presence of acidic catalysts or with performic acid formed in situ from formic acid and hydrogen peroxide. The oxirane rings of the epoxidized carboxylic acids and/or carboxylic acid derivatives are then opened to form hydroxy groups by reaction with hydrogen or protic compounds, such as water, linear and/or branched alkyl and/or alkenyl alcohols containing 1 to 18 carbon atoms or linear and/or branched, saturated and/or unsaturated $C_{1-18}$ carboxylic acids. However, other natural or synthetic compounds containing epoxide-containing carboxylic acids or carboxylic acid derivatives, such as castor oil or hydrogenated castor oil, may also be used. The ring opening conditions are selected so that the acid derivative and acid groups present remain intact. The reaction of epoxidized carboxylic acid derivatives and/or epoxidized carboxylic acids with protic compounds may be carried out, for example, by the process described in DE 39 23 394.

The carboxylic acids and/or carboxylic acid derivatives containing carboxylic acid functions with at least one OH group in the 9, 10, 13 and/or 14 position which are obtained by opening of the oxirane rings are then reacted with ethylene oxide, propylene oxide and/or butylene oxide by known industrial processes. The reaction is preferably carried out with ethylene oxide and/or propylene oxide. It is particularly preferred to use alkoxylation products obtained by alkoxylation of compounds corresponding to formula (I), in which $R^1$ is a group $OR^2$ where $R^2$ is a group corresponding to formula (II). Compounds in which $R^3$ is an alkyl group containing 8 to 16 carbon atoms and preferably 8 to 10 carbon atoms are particularly preferred.

The alkoxylated compounds are used in particular for cleaning borenoles. More particularly, the walls of the borehole itself or even production tubes or casing walls can be cleaned using the alkoxylated compounds. Drilling equipment in the context of the invention includes, for example, pipelines and tools which are used in drilling operations and which come into contact with other drilling muds and/or crude oil. In addition, the alkoxylation products may also be used for cleaning drill cuttings. Drill cuttings accumulate during the drilling process and, in the case of offshore drilling, have to be dumped on the seabed in the vicinity of the drilling platform which can lead to the large-scale introduction of mineral oil into the environment. In order largely to avoid ecological damage to the sea, the cuttings are cleaned and freed from residues of the drilling mud before dumping.

Alkoxylation products obtained by reaction of mono-, di- or triglycerides of the $C_{10-22}$ carboxylic acids with ethylene oxide, propylene oxide and/or butylene oxide are preferably used. The alkoxylation products are preferably obtained by addition of 0.2 to 4 parts of ethylene oxide, propylene oxide and/or butylene oxide with 1 part of the OH-containing $C_{10-22}$ carboxylic acids and/or $C_{10-22}$ carboxylic acid derivatives. Alkoxylation products obtained by addition of 1.0 to 2.0 parts and, more particularly, 1.5 to 1.8 parts of ethylene oxide, propylene oxide and/or butylene oxide with 1 part of the OH-containing $C_{10-22}$ carboxylic acids and/or $C_{10-22}$ carboxylic acid derivatives are particularly preferred. Products obtained by reaction with ethylene oxide and/or propylene oxide are particularly suitable. It can be of particular advantage to use products obtained by reaction solely with ethylene oxide or solely with propylene oxide.

It is of advantage to use the alkoxylation products in the form of a mixture with certain alcohols. These mixtures may be directly added to a stimulation fluid. However, they are preferably formulated together with additional ingredients to form cleaning compositions which are used for cleaning boreholes, drilling equipment or drill cuttings.

Accordingly, the present invention also relates to additives for cleaning boreholes, drilling equipment or drill cuttings which contain the biodegradable alkoxylation products described above in quantities of 40 to 90% by weight and $C_{1-10}$ alcohols in quantities of 10 to 60% by weight. In addition, the additives preferably contain 1 to 10% by weight of water.

The alcohols may be branched or unbranched, saturated or unsaturated. Alcohols equivalent in their ecological compatibility to the alkoxylation products mentioned above are preferred Suitable alcohols are, for example, ethanol, hexanol, octanol, methyl hexanol. 2-Ethyl hexanol and butyl glycol are particularly preferred. However, other compounds which have a high flashpoint, preferably terpenes and/or terpene alcohols, may also be used. Limonene is particularly preferred.

In addition, the additives contain esters of $C_{1-24}$ fatty acids with $C_{1-18}$ alcohols. Suitable alcohols also include polyols, such as ethylene glycol, glycerol or trimethylol propane. Esters of $C_{2-12}$ alcohols with $C_{18-24}$ fatty acids, C4-12 fatty acids and $C_{12-16}$ fatty acids are preferred. The additives advantageously contain mixtures of these esters with 2-ethyl hexanol or butyl glycol, preferably in a ratio by weight of 2:1 to 1:2 and more preferably in a ratio of 1:1. Additives such as these are particularly suitable for cleaning soil of high oil content or as oil spill dispersants. In the latter case, crude oil floating on the surface of water is sprayed with the compositions so that the oil is dispersed into fine droplets which undergo more rapid biological degradation. Conventional surfactants have hitherto been used for this purpose although they have higher aquatic toxicity than the alkoxylation products present in the compositions according to the invention because the known surfactants greatly reduce surface tension.

The additives are preferably formulated as solutions or dispersions, compositions containing salt water being preferred. However, other suitable solvents may also be used. Accordingly, the invention also relates to compositions for cleaning boreholes, drilling equipment or drill cuttings which contain the additives described above dissolved or dispersed in seawater or highly concentrated salt solutions.

Seawater in the context of the present invention is water with a salt content of 0.2 to 5% by weight (cf. Römpps Chemie-Lexikon, 9th Edition 1992, pages 2669–2670). The compositions may contain the additives in quantities of 1 to 90% by weight although compositions containing the additives in quantities of 1 to 10% by weight, based on the composition as a whole, are preferred. Besides the additives according to the invention, the compositions may contain other suitable ingredients, such as emulsifiers or thickeners, for example polymers or carboxymethyl cellulose, fluid loss additives or weighting agents, such as barite. The compositions according to the invention are particularly suitable for cleaning boreholes where ester-based water-containing invert muds have been used. The compositions may also be used with advantage in boreholes which are to be prepared for cementing or where the annular space between the casing and production tube is to be filled with a packer fluid. Not only metal surfaces, such as the surfaces of drill pipes and casings, but also and in particular the walls of oil boreholes can be cleaned with the compositions according to the invention.

The compositions according to the invention may be used in all cleaning processes known to the expert which are involved in geological drilling both offshore and on land. These cleaning processes include, in particular, the removal of paraffin deposits from borehole walls. Boreholes are normally cleaned by a cleaning fluid being pumped under pressure through the borehole and the deposits being removed from the walls of the borehole by the cleaning fluid. The deposits are transported from the borehole with the fluid. Accordingly, the present invention also relates to a process for cleaning boreholes in which one of the compositions according to the invention is pumped through the borehole by the method described above.

The compositions may also be used for cleaning preferably oil-covered articles, such as tools, pipelines or drill cuttings which accumulate in geological drilling. To this end, the composition according to the invention is sprayed onto or applied to the surfaces of the articles or the articles to be cleaned are immersed in the compositions. The oil and other soil types are thus removed from the surfaces. The surfaces are then contacted with water so that the compositions are removed with the soils. For example, the surfaces are sprayed with a jet of water.

Accordingly, the present invention also relates to a process for cleaning the surfaces of drilling equipment or drill cuttings in which the surfaces are first contacted with a cleaning fluid and are then sprayed with water, one of the compositions according to the invention described above being used as the cleaning fluid.

EXAMPLES

To determine the cleaning performance of borehole cleaning compositions, three different compounds are diluted with seawater to form solutions containing 5% by weight of an additive. These additives contain (based on the weight of the additives) 56% by weight of 2-ethyl hexanol, 1% by weight of water and 45% by weight of A sorbitan monooleate+10 EO (OMC 809, a product of Henkel KGaA)

B sorbitan monooleate+20 EO (Tween 20, a product of Atlas)

C reaction product of a hydrogenated soybean oil epoxide with 61% by weight EO reacted with head-fractionated fatty acid. Component C was prepared by heating 1225 g (7.9 moles) of head-fractionated fatty acid (60% C$_8$, 35% C$_{10}$, acid value 361.9) with stirring to 150° C. and adding 1770 g (7.5 moles, based on epoxide oxygen) of soybean oil epoxide (epoxide oxygen=6.78) over a period of 1 hour. After the addition, the temperature was slowly increased to 170° C., followed after 2 hours (epoxide oxygen <0.15%) by distillation in vacuo up to 200° C. (469 g distillate). The end product is a yellow clear polyol (viscosity 5550 mPas; 20° C.; OH value 105, saponification value 236, acid value 3.1).

After the addition of 6.9 g of a 30% solution of potassium hydroxide in methanol, 423 g (39 parts) of the reaction product of soybean oil epoxide with head-fractionated fatty acid were heated in an autoclave to 100° C. At this temperature, the traces of methanol present were removed by 5× evacuation and purging with nitrogen as inert gas. After the reaction temperature had been raised to 150° C., a total of 660 g (61 parts) of ethylene oxide was added in portions in such a way that the pressure in the reactor did not exceed 5 bar. After the reaction, the temperature was reduced to 80–100° C. and, to remove traces of ethylene oxide, a vacuum was applied for about 15 minutes and the reaction mixture was neutralized with lactic acid. The crude product is a clear yellow liquid (OH value 54.7).

The soil used was an invert drilling mud which had been conventionally prepared using the following ingredients:

| | |
|---|---|
| 250 ml | 2-ethyl hexyl oleate |
| 83.5 g | water |
| 42.6 g | organophilic bentonite |
| 1.2 g | lime |
| 9.7 g | w/o emulsifier ("EZ-Mul" of NL Baroid) |
| 100.0 g | CaCO$_3$ |
| 100.0 g | barite |
| 26.8 g | CaCl$_2$.2H$_2$O |
| 42.6 g | oganophilic lignite ("Duratone" of NL Baroid) |

The plastic viscosity (PV), yield point (YP) and gel strength after 10 seconds and 10 minutes were first determined by viscosity measurements at 50° C. before ageing. The invert mud was then aged for 16 h at 200° F. in a roller oven and the viscosity values were remeasured at 50° C.

The following results were obtained:

| | Before Ageing | After Ageing |
|---|---|---|
| Plastic viscosity (PV) [cP] | 175 | 130 |
| Yield point (YP) [lb/200 ft$^2$] | 128 | 95 |
| Gel strength [lb/100 ft$^2$] | | |
| 10 seconds | 31 | 51 |
| 10 minutes | 27 | 30 |

Using a brush, 8 g of the aged drilling mud were uniformly applied to the walls of a mixing beaker of known weight up to the 350 ml mark. 200 ml of the 5% by weight cleaning solution were then poured into the mixing beaker which was then shaken by hand for 3 minutes. The solution was then poured out and the mixing beaker was placed upside down, i.e. with its opening underneath, on a filter paper for 2 minutes. The mixing beaker was then weighed. The percentage cleaning effect could be determined from the difference in relation to the known weight of the mixing beaker and the drilling mud. The beaker was then reshaken for 3 minutes with the previously used solution. The mixing beaker was then reweighed after it had been placed upside down on a filter paper for another 2 minutes.

The percentage cleaning performance of the individual compositions is shown in Table 1.

TABLE 1

| Composition | % Cleaning Performance 1st Cleaning Step | % Cleaning Performance 2nd Cleaning Step |
|---|---|---|
| A | 0 | 38.2 |
| B | 0.5 | 20.2 |
| C | 28.6 | 38.9 |

The test results show that the biodegradable compositions (C) according to the invention are comparable in their cleaning performance on oil-covered surfaces with the hitherto known, ecologically unsafe compounds based on ethoxylated sorbitan monofatty acid esters (A and B), but by comparison develop a distinct cleaning effect in only the first cleaning step. Accordingly, the alkoxylation products according to the invention act more quickly than the comparison products.

The biological degradability of the alkoxylation product used in composition (C) was determined by OECD method 301 A (die-away test). It was found that 54% of the DOC (dissolved organic carbon) could not be detected after 28 days.

The EC$_{50}$ for the same substance is 800 mg/l (daphnia test, acute toxicity as measured in accordance with EU Guideline 92/69/EEC, 31st July, 1992)

The LC$_{20}$ is 220 mg/l (zebra fish test, acute toxicity as measured in accordance with EU Guideline 92169/EEC, 31st July, 1992).

What is claimed is:

1. A process for cleaning boreholes, drilling equipment and drill cuttings comprising:
    (a) forming a cleaning additive comprising at least one alkoxylation product obtained by the reaction of ethylene oxide, propylene oxide, butylene oxide or mixtures thereof with an OH-containing C$_{10-22}$ carboxylic acid or derivative thereof, wherein structural units corresponding to formula (I):

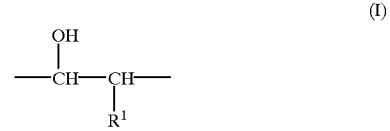

(I)

comprise one or both of the 9/10 or 13/14 positions, wherein R$^1$ is a hydrogen atom, an OH group or a OR$^2$ group, R$^2$ is an alkyl group containing 1 to 18 carbon atoms, an alkenyl group containing 2 to 18 carbon atoms or a group corresponding to formula (II):

(II)

wherein R$^3$ is a hydrogen atom, an alkyl group containing 1 to 21 carbon atoms or an alkylene group containing 2 to 21 carbon atoms; and
    (b) contacting the surface of a borehole, drilling equipment or drill cuttings with the cleaning additive.

2. The process of claim 1 wherein the cleaning additive is formed by the reaction of ethylene oxide, propylene oxide or butylene oxide with a mono-, di- or triglyceride of $C_{10-22}$ carboxylic acid.

3. The process of claim 1 wherein the carboxylic acid or the carboxylic acid in the derivative thereof contains 16 to 22 carbon atoms.

4. The process of claim 1 wherein the carboxylic acid or the carboxylic acid in the derivative thereof comprises a $C_{10-22}$ carboxylic acid $C_{1-18}$ alkyl ester.

5. The process of claim 1 wherein the cleaning additive is formed by reacting 0.2 to 4 moles of ethylene oxide, propylene oxide or butylene oxide with 1 mole of OH-containing $C_{10-22}$ carboxylic acid or derivative thereof.

6. The process of claim 5 wherein the cleaning additive is formed by reacting 1.0 to 2.0 moles of ethylene oxide, propylene oxide or butylene oxide with 1 mole of OH-containing $C_{10-22}$ carboxylic acid or derivative thereof.

7. The process of claim 6 wherein the cleaning additive is formed by reacting 1.5 to 1.8 moles of ethylene oxide, propylene oxide or butylene oxide with 1 mole of OH-containing $C_{10-22}$ carboxylic acid or derivative thereof.

8. The process of claim 1 wherein the cleaning additive further comprises a $C_{1-10}$ alcohol.

9. The process of claim 8 wherein said alcohol is 2-ethyl hexanol or butyl glycol.

10. The process of claim 1 wherein the cleaning additive further comprises 1 to 10 percent water.

11. The process of claim 1 further comprising dissolving or dispersing the cleaning additive in seawater.

12. The process of claim 1 wherein the cleaning additive is present at 1 to 90 percent by weight in a cleaning composition, based on the composition as a whole.

13. The process of claim 12 wherein the cleaning additive is present at 1 to 10% by weight in a cleaning composition, based on the composition as a whole.

14. The process of claim 1 comprising pumping the cleaning additive through a borehole under pressure.

15. The process of claim 1 comprising applying the cleaning additive to a surface by spraying or immersion.

16. The process of claim 15 further comprising rinsing said surface with water to remove the cleaning additive.

17. A process for cleaning boreholes, drilling equipment and drill cuttings comprising:
(a) forming a cleaning additive comprising
  (i) from 10 to 60 percent by weight of at least one $C_{1-10}$ alkyl alcohol; and
  (ii) from 40 to 90 percent by weight of at least one alkoxylation product obtained by the reaction of ethylene oxide, propylene oxide, butylene oxide or mixtures thereof with an OH-containing $C_{10-22}$ carboxylic acid or derivative thereof, wherein structural units corresponding to formula (I):

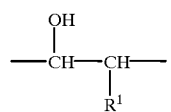

(I)

comprise one or both of the 9/10 or 13/14 positions, wherein $R^1$ is a hydrogen atom, an OH group or a $OR^2$ group, $R^2$ is an alkyl group containing 1 to 18 carbon atoms, an alkenyl group containing 2 to 18 carbon atoms, or a group corresponding to formula (II):

(II)

wherein $R^3$ is a hydrogen atom, an alkyl group containing 1 to 21 carbon atoms or an alkylene group containing 2 to 21 carbon atoms, and
(b) contacting the surface of a borehole, drilling equipment or drill cuttings with the cleaning additive.

18. The process of claim 17 wherein the at least one alkoxylation product is formed by the reaction of ethylene oxide, propylene oxide or butylene oxide with a mono-, di- or triglyceride of $C_{10-22}$ carboxylic acid.

19. The process of claim 17 wherein the carboxylic acid or the carboxylic acid in the derivative thereof in (ii) contains 16 to 22 carbon atoms.

20. The process of claim 17 wherein the carboxylic acid or the carboxylic acid in the derivative thereof in (ii) comprises a $C_{10-22}$ carboxylic acid $C_{1-18}$ alkyl ester.

21. The process of claim 17 wherein the at least one alkoxylation product formed by reacting 0.2 to 4 moles of ethylene oxide, propylene oxide or butylene oxide with 1 mole of OH-containing $C_{10-22}$ carboxylic acid or derivative thereof.

22. The process of claim 21 wherein the at least one alkoxylation product is formed by reacting 1.0 to 2.0 moles of ethylene oxide, propylene oxide or butylene oxide with 1 mole of OH-containing $C_{10-22}$ carboxylic acid or derivative thereof.

23. The process of claim 22 wherein the at least one alkoxylation product is formed by reacting 1.5 to 1.8 moles of ethylene oxide, propylene oxide or butylene oxide with 1 mole of OH-containing $C_{10-22}$ carboxylic acid or derivative thereof.

24. The process of claim 17 wherein (i) is 2-ethyl hexanol or butyl glycol.

25. The process of claim 17 wherein the cleaning additive further comprises 1 to 10 percent water.

26. The process of claim 17 further comprising dissolving or dispersing the cleaning additive in seawater.

27. The process of claim 17 wheirein the cleaning additive is present at 1 to 90 percent by weight in a cleaning composition, based on the composition as a whole.

28. The process of claim 27 wherein the cleaning additive is present at 1 to 10% by weight in a cleaning composition, based on the composition as a whole.

29. The process of claim 17 comprising pumping the cleaning additive through a borehole under pressure.

30. The process of claim 17 comprising applying the cleaning additive to a surface by spraying or immersion.

31. A process for cleaning boreholes, drilling equipment and drill cuttings comprising:
(a) forming a cleaning additive comprising
  (i) at least one alkoxylation product obtained by the reaction of ethylene oxide, propylene oxide, butylene oxide or mixtures thereof with an OH-containing $C_{10-22}$ carboxylic acid or derivative thereof, wherein structural units corresponding to formula (I):

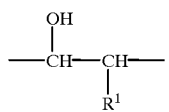

comprise one or both of the 9/10 or 13/14 positions, wherein $R^1$ is a hydrogen atom, an OH group or a $OR^2$ group, $R^2$ is an alkyl group containing 1 to 18 carbon atoms, an alkenyl group containing 2 to 18 carbon atoms or a group corresponding to formula (II):

wherein $R^3$ is a hydrogen atom, an alkyl group containing 1 to 21 carbon atoms or an alkylene group containing 2 to 21 carbon atoms, and (ii) at least one ester of a $C_{1-24}$ fatty acid with a $C_{1-18}$ alcohol; and (b) contacting the surface of a borehole, drilling equipment or drill cuttings with the cleaning additive.

32. The process of claim 31 wherein the at least one alkoxylation product is formed by the reaction of ethylene oxide, propylene oxide or butylene oxide with a mono-, di- or triglyceride of $C_{10-22}$ carboxylic acid.

33. The process of claim 31 wherein the carboxylic acid or the carboxylic acid in the derivative thereof in (ii) contains 16 to 22 carbon atoms.

34. The process of claim 31 wherein the carboxylic acid or the carboxylic acid in the derivative thereof in (ii) comprises a $C_{10-22}$ carboxylic acid $C_{1-18}$ alkyl ester.

35. The process of claim 31 wherein the at least one alkoxylation product is formed by reacting 0.2 to 4 moles of ethylene oxide, propylene oxide or butylene oxide with 1 mole of OH-containing $C_{10-22}$ carboxylic acid or derivative thereof.

36. The process of claim 35 wherein the at least one alkoxylation product formed by reacting 1.0 to 2.0 moles of ethylene oxide, propylene oxide or butylene oxide with 1 mole of OH-containing $C_{10-22}$ carboxylic acid or derivative thereof.

37. The process of claim 36 wherein the at least one alkoxylation product is formed by reacting 1.5 to 1.8 moles of ethylene oxide, propylene oxide or butylene oxide with 1 mole of OH-containing $C_{10-22}$ carboxylic acid or derivative thereof.

38. The process of claim 37 wherein the cleaning additive is present at 1 to 10% by weight in a cleaning composition, based on the composition as a whole.

39. The process of claim 31 comprising pumping the cleaning additive through a borehole under pressure.

40. The process of claim 31 comprising applying the cleaning additive to a surface by spraying or immersion.

41. The process of claim 31 wherein (ii) is at least one ester of a $C_{2-12}$ alcohol with a $C_{18-24}$ fatty acid.

42. The process of claim 31 wherein (ii) is at least one ester of a $C_{4-12}$ fatty acid or a $C_{12-16}$ fatty acid and a $C_{2-12}$ alcohol.

* * * * *